June 28, 1966 D. W. MATTOS ETAL 3,258,045
FRUIT PITTING APPARATUS
Filed May 10, 1963 6 Sheets-Sheet 4
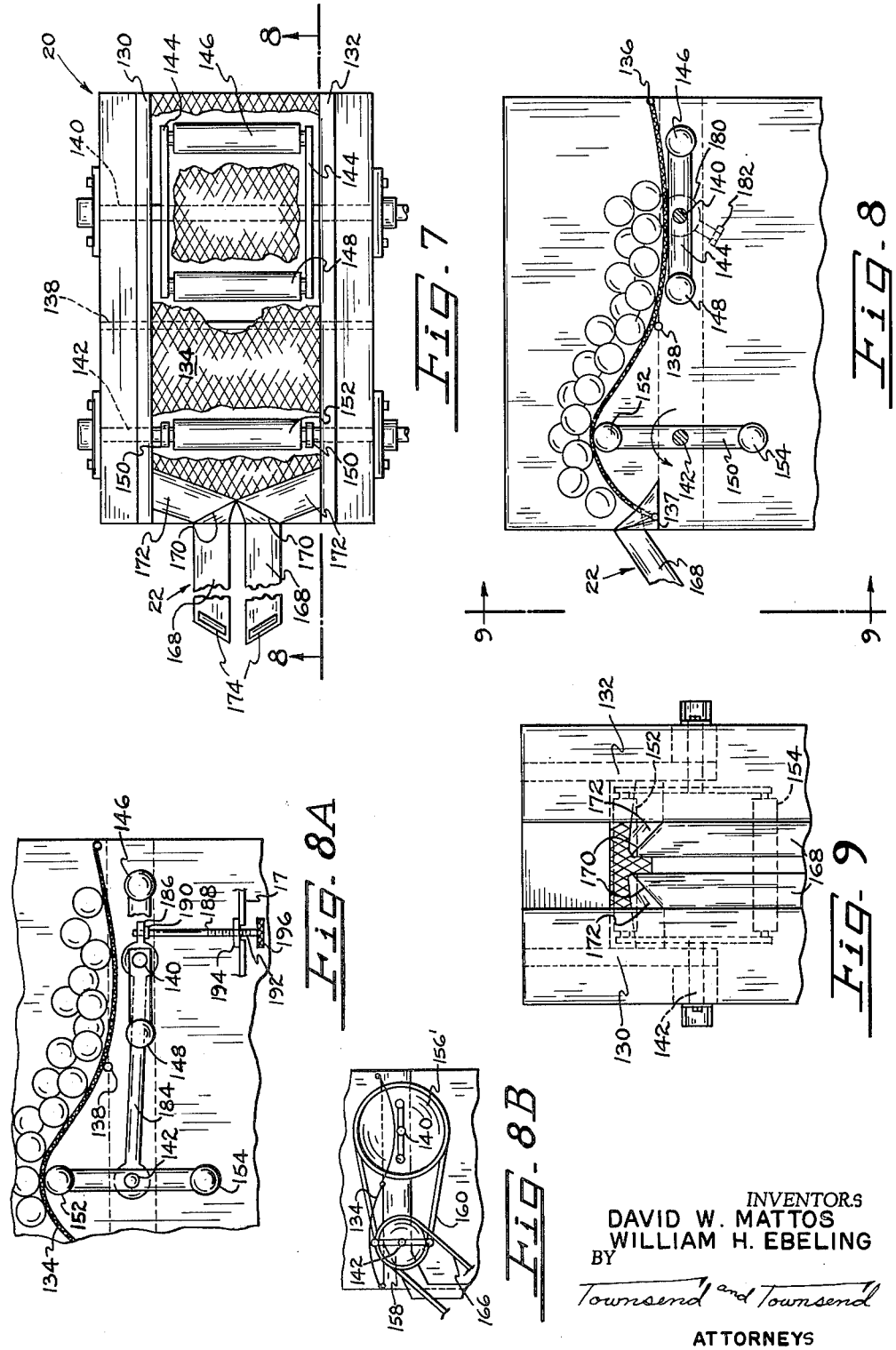
INVENTORS
DAVID W. MATTOS
WILLIAM H. EBELING
BY
Townsend and Townsend
ATTORNEYS

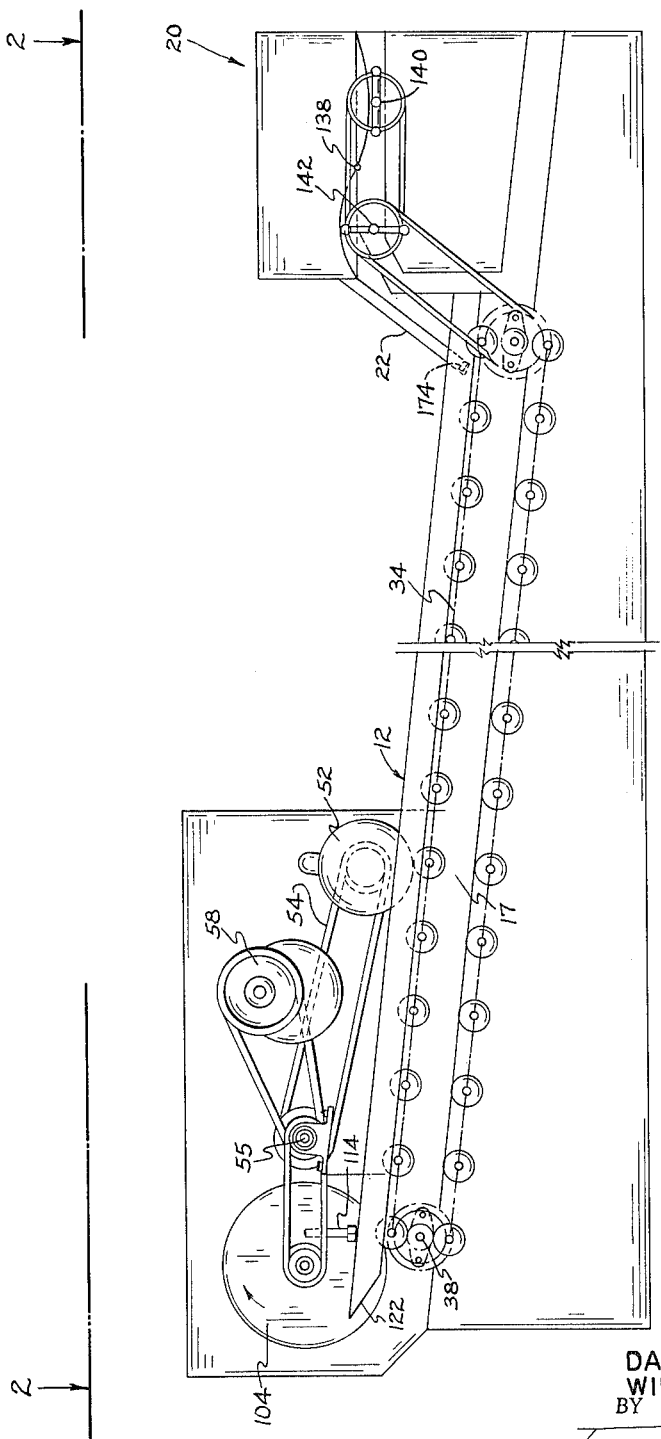

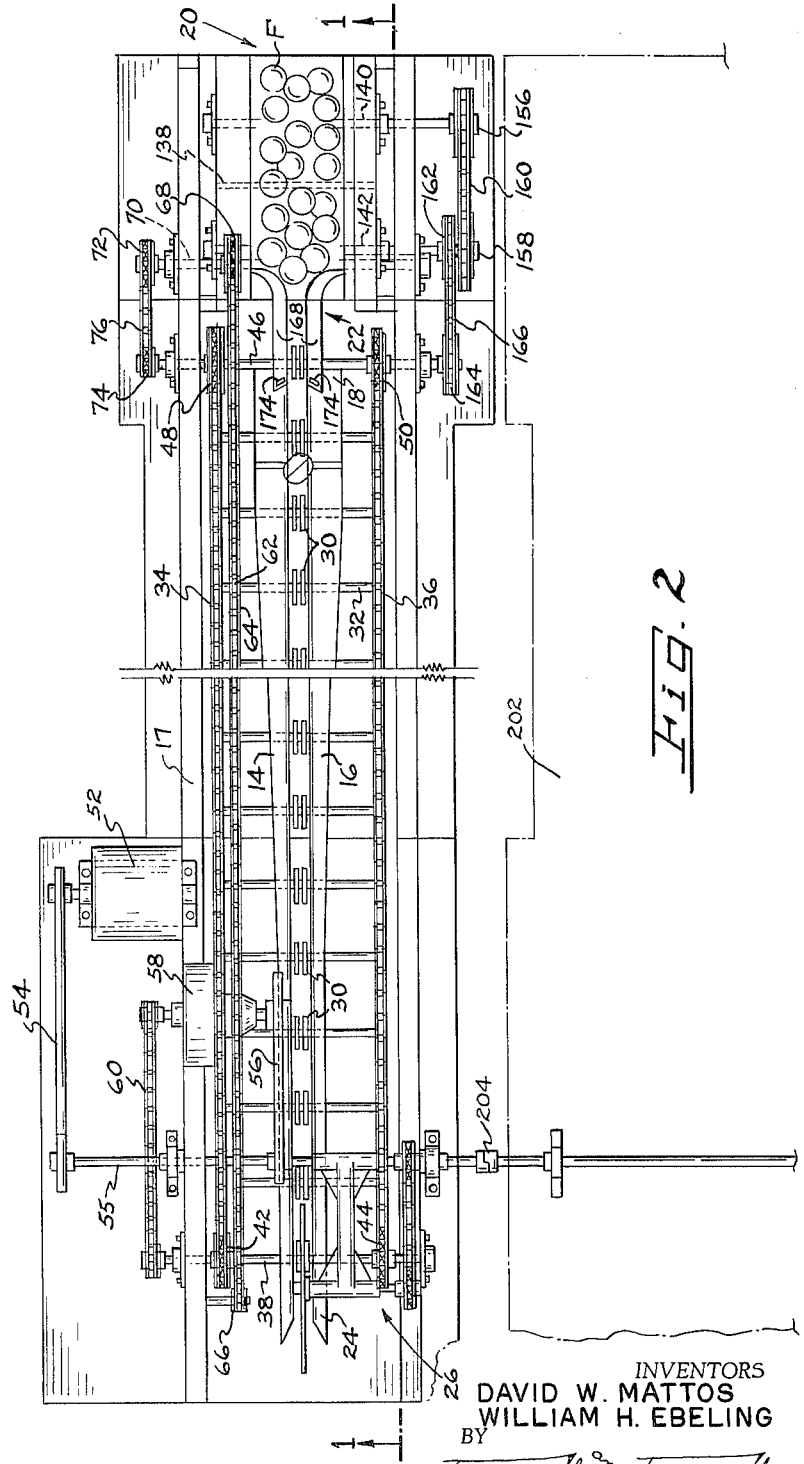

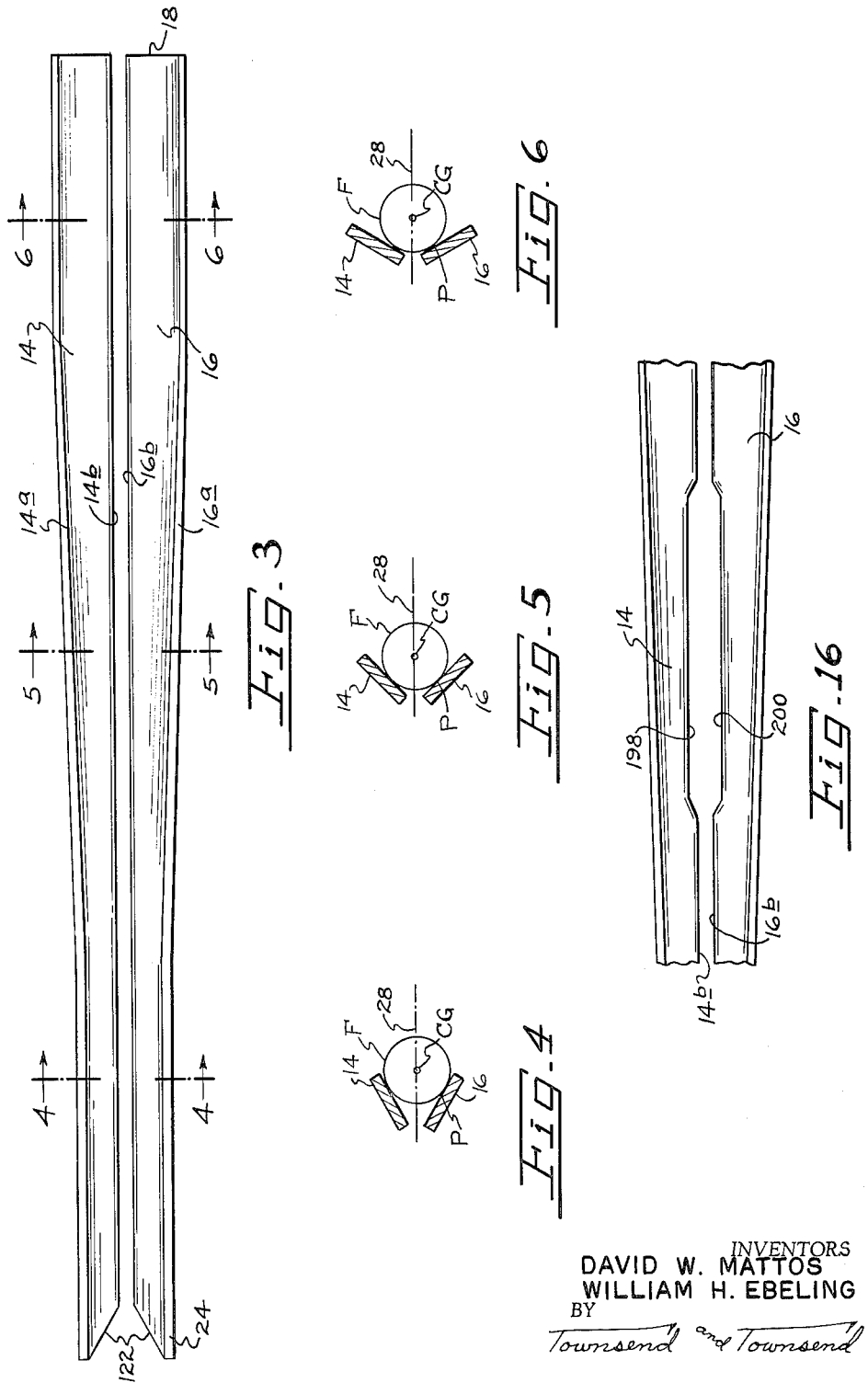

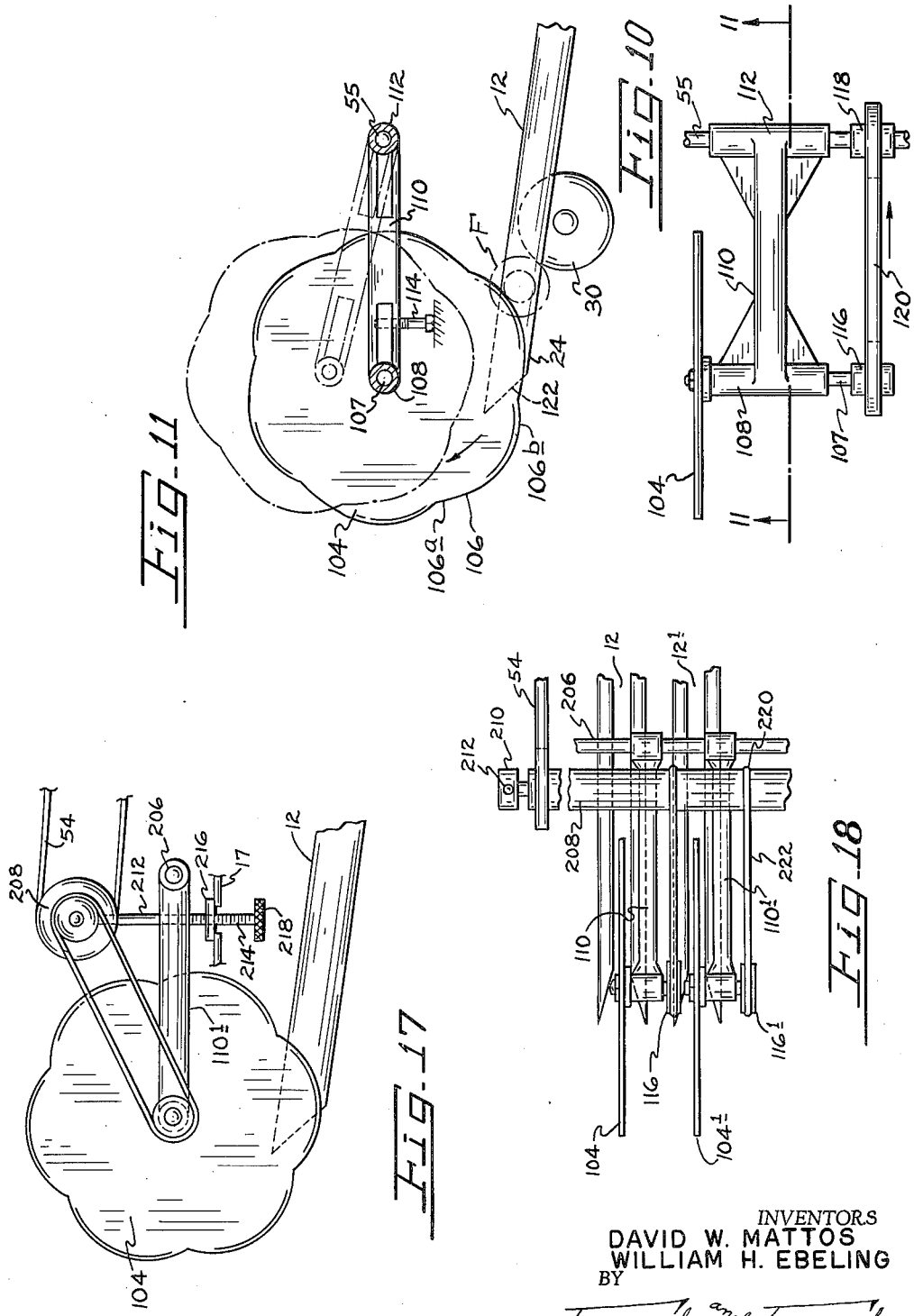

June 28, 1966 D. W. MATTOS ETAL 3,258,045
FRUIT PITTING APPARATUS
Filed May 10, 1963 6 Sheets-Sheet 6
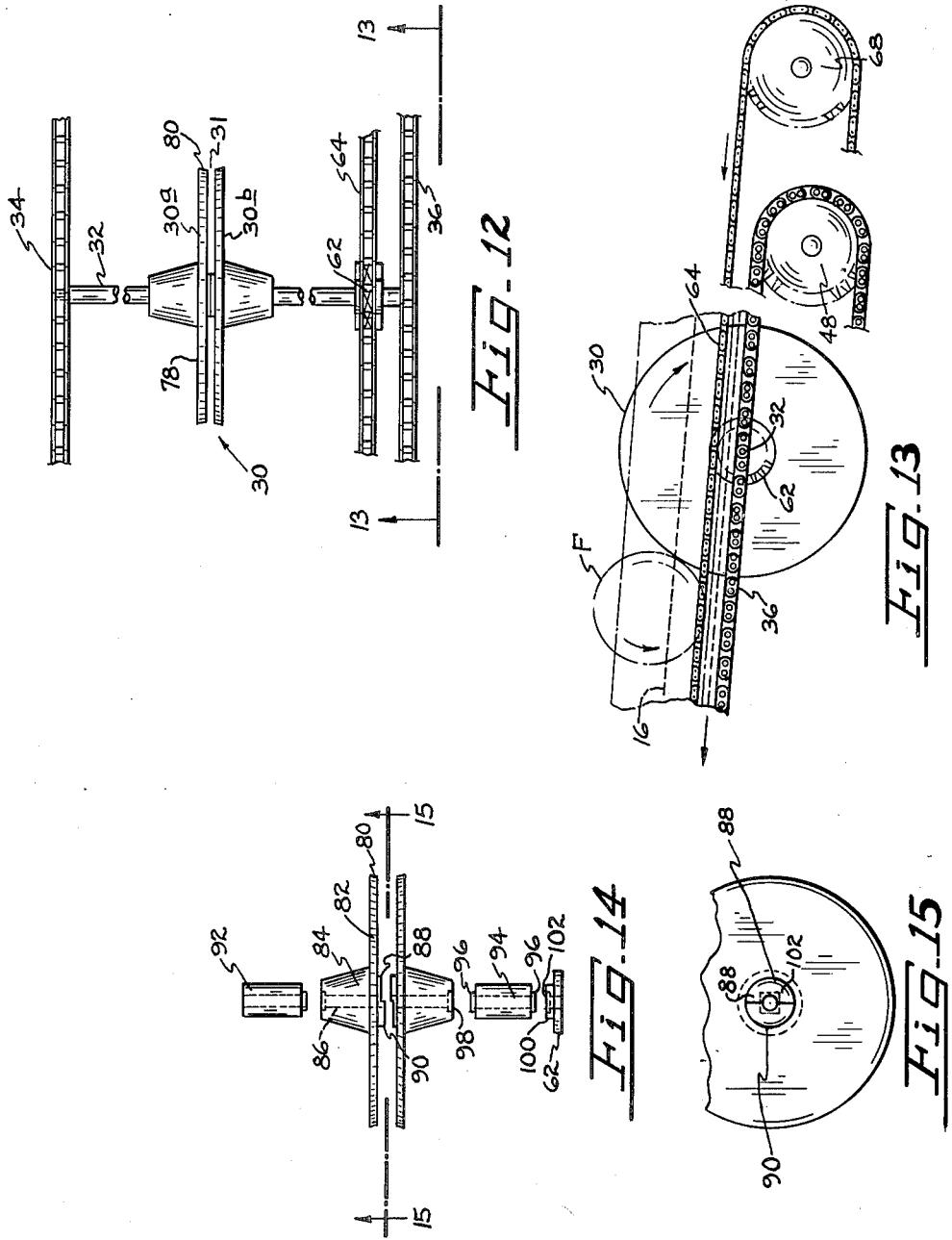
INVENTORS
DAVID W. MATTOS
WILLIAM H. EBELING
BY
Townsend and Townsend
ATTORNEYS

United States Patent Office 3,258,045
Patented June 28, 1966

3,258,045
FRUIT PITTING APPARATUS
David W. Mattos, Rte. 2, Box 861, Crosley Ave., San Jose, Calif., and William H. Ebeling, 208 W. Cherry Lane, Campbell, Calif.
Filed May 10, 1963, Ser. No. 279,453
15 Claims. (Cl. 146—28)

This invention relates to apparatus for pitting fruit such as apricots, peaches and the like by halving individual fruit pieces along the suture line thereof and expelling the pit therefrom.

Removal of pits from apricots, peaches and like fruits is an important step in the commercial processing of such fruit. Typically, each piece of fruit is bisected or halved in removing the pit from the fruit; from the standpoint of both the processor and the consumer, halving the fruit along the suture is desirable. The fruit is normally symmetrical with respect to the suture line so that consistent halving along that line produces uniform fruit slices, a characteristic pleasing to the consumer. Because the suture line is the natural line of dehiscene, splitting along such line requires less energy and makes easier the expulsion of the pit. In fact commercially halved fruit is graded according to how near the suture line the fruit is split, the grading being higher as the line of split approaches the suture line.

Due to cost factors it is not commercially practicable to pit and halve the fruit manually; therefore machines that automatically perform these operations are desirable. Such machines are preferably fully automatic, accurate with respect to splitting the fruit along the suture line, and capable of high speed operation. The foregoing operations must be carried out without unnecessarily bruising or abrading the fruit.

The present invention accomplishes all of the foregoing desiderata. The specific embodiment to be described in detail hereinafter includes a receptacle for receiving the fruit, which receptacle has a bottom formed of a sheet of flexible material, a mechanism for serially discharging individual pieces of fruit from the receptable, a generally V-shaped trough for receiving the discharged fruit pieces, devices for rolling the individual fruit pieces along the trough, the side walls of the trough being so slanted relative one another that only two points on the surface of the fruit engage the trough and being arranged to gradually converge so that the points of fruit engagement approach one another as the fruit is rolled along the trough, thereby assuring that the suture line is vertically aligned, and a knife depending into the trough for halving the fruit and expelling the pit.

An object of this invention is to provide means for so aligning each individual fruit piece, irrespective of the particular size or shape of the fruit pieces, that its suture line lies in a preselected plane. This object is attained by providing a trough, the sides of which are arranged in a generally V-shaped configuration, and rolling the fruit along the trough. At the end of the trough into which the fruit is first fed, the trough sides define an obtuse angle; the sides converge gradually and continuously to define an acute angle therebetween. Thus, since the two points of the fruit that engage opposite trough walls tend to assume the same level and since the fruit is symmetrical only about the suture line and has its smallest diameter normal to the suture line, the suture line will be aligned vertically when it has traversed the trough.

Another object of this invention is to simultaneously cut the fruit and expel the seed therefrom. This object is fulfilled by disposing in the plane of the suture line a rotating, generally circular knife blade having a plurality of undulations about the periphery thereof. The presence of the undulations provides a gradual variation in force applied to the fruit by the knife, thus to automatically compensate for varying degrees of hardness between different fruit pieces.

Still another object is to provide a structure for supporting larger pieces of fruit adjacent the knife for a longer period than the period during which relatively smaller pieces are supported. Fulfillment of this object is necessary since larger pieces of fruit require more cutting time and more time to expel the relatively larger pit; fulfillment is secured by forming the end of the trough adjacent the knife with rearwardly sloping end edges. Thus, larger diameter fruit will be positioned higher in the trough and remain supported by the trough walls longer than small diameter fruit which is positioned lower in the trough.

Yet another object is to provide a device for serially aligning fruit from an unorganized accumulation thereof. This object is fulfilled by providing a receptacle for supporting the unorganized accumulation of fruit, which receptacle has a loosely mounted, flexible bottom, and by providing beneath the flexible bottom a member for intermittently raising and lowering the bottom. One end of the receptacle is formed with a downwardly sloping output trough so that each time the flexible bottom is raised one or more pieces of fruit are introduced into the trough from the receptacle. An important advantage of such device is that direct rubbing contact with the fruit is avoided.

A further object is to provide a device in which only one piece of fruit is presented to the halving knife at a given time. This object is attained by spacing apart the lower edges of the V-shaped trough and providing rotating dual circular members that extend up into the trough through the space. The circular members are driven both translationally and rotatively, the direction of rotation of the upper portion of the circular member being opposite the direction of translational movement. A single piece of fruit in front of each circular member will be rolled along the trough toward the cutting knife; however, should two or more pieces of fruit be disposed ahead of a given circular member the forward piece of fruit will brake the rotational movement of the piece of fruit engaging the circular member. The latter piece of fruit is therefore carried over the circular member leaving only the former piece of fruit ahead of the circular member.

A still further object is to provide apparatus for automatically grading fruit as to size. This object is secured by spacing apart the lower edges of the trough walls by an amount sufficient to permit undersized fruit to drop between such space. Because the fruit will be aligned in the trough with the smallest dimension transverse the direction of movement, no undersized fruit can be inadvertently transported through the trough.

Yet a further object is to provide fruit pitting apparatus wherein the capacity can be increased by duplicating portions thereof.

These and other objects will be more apparent after referring to the following specification and attached drawings in which:

FIGURE 1 is a side cross sectional elevational view of the preferred embodiment of my invention;

FIGURE 2 is a top view taken substantially along line 2—2 of FIGURE 1;

FIGURE 3 is a plan view showing the fruit-transporting and aligning trough of the present invention in detail;

FIGURE 4 is a cross sectional view of one portion of the trough taken along line 4—4 of FIGURE 3;

FIGURE 5 is a cross sectional view of the central portion of the trough taken along line 5—5 of FIGURE 3;

FIGURE 6 is a cross sectional view of the trough at the input end thereof taken along line 6—6 of FIGURE 3;

FIGURE 7 is a partially cut away top view of the mechanism for conveying and serially aligning the fruit;

FIGURE 8 is a cross sectional elevation view of the fruit conveyor taken along line 8—8 of FIGURE 7;

FIGURE 8A is a view similar to FIGURE 8 showing a modification for altering the rate of fruit conveyance;

FIGURE 8B is a side view of the fruit conveyor at a reduced scale showing a second modification for altering the rate of fruit conveyance;

FIGURE 9 is a view of the discharge end of the device for conveying and serially aligning the fruit taken along line 9—9 of FIGURE 7;

FIGURE 10 is a top view showing the details of the fruit cutting knife;

FIGURE 11 is an elevation view of the fruit cutting knife taken along line 11—11 of FIGURE 10;

FIGURE 12 is a detail plan view of a circular member for imparting translational and rotational movement to the fruit in the trough;

FIGURE 13 is an elevational view of the mechanism of FIGURE 12 showing the driving mechanism therefor in detail;

FIGURE 14 is an exploded view showing the constituent parts of the circular member of FIGURE 12;

FIGURE 15 is a cross-sectional view taken along line 15—15 of FIGURE 14;

FIGURE 16 is a plan view of the trough of our invention modified to reject undersized fruit pieces;

FIGURE 17 is a side view of a modified fruit cutting knife supporting structure particularly useful on multi-knife apparatus; and FIGURE 18 is a top view of the structure of FIGURE 17.

Referring more particularly to the drawings, reference numeral 12 indicates a sloped fruit-aligning trough formed by two opposed slanting elongate planar members 14 and 16 supported on a frame 17. Adjacent one end 18 of trough 12, the inlet end, is a receptacle 20 for receiving fruit; a chute 22 is provided for serially discharging individual fruit pieces F onto trough 12 from the receptacle. Proximate the opposite end 24 of trough 12, the outlet end, a fruit cutting knife designated generally as 26 is disposed and is adapted to split each individual fruit piece so as to expel the pit therefrom. An unorganized acumulation of fruit deposited in receptacle 20 is serially discharged into inlet end 18 of trough 12, and each piece of fruit is transported along trough 12 wherein it is aligned with the suture line in a vertical plane. Upon arrival of the fruit at outlet end 24 of the trough, the fruit is cut along the suture line by knife 26.

Planar members 14 and 16 slant downwardly and inwardly from their respective outer edges 14a and 16a to their respective inner edges 14b and 16b to define trough 12. The planar members are symmetrically disposed relative a vertical plane 28 (FIGURES 4-6) and include an obtuse angle at inlet end 18 (FIGURE 6). At outlet end 24 planar members 14 and 16 include an acute angle (FIGURE 4) and diverge smoothly and continuously toward inlet end 18. FIGURE 5 illustrates an exemplary angle included between the planar member intermediate trough ends 18 and 24. In one installation of our invention the angle included between planar members 14 and 16 at inlet end 18 is approximately 115° and the included angle at outlet end 24 is approximately 50°; trough 12 slopes upwardly from inlet end 18 at about 8° and is approximately 12 feet in length.

A plurality of dual circular members 30 is provided below the trough, which members extend up into the trough between lower edges 14b and 16b of planar members 14 and 16. As shown in more detail in FIGS. 12 and 13, each dual member includes two disk sections 30a and 30b spaced apart at 31 and concentrically mounted on a shaft 32. Shaft 32 is disposed transverse the longitudinal direction of trough 12 and is mounted for rotation at opposite ends thereof to links of conventional endless drive chains 34 and 36. Below trough 12 at outlet end 24, a transverse shaft 38 is rotatably journaled in frame 17 and has sprockets 42 and 44 keyed thereon for supporting one end of drive chains 34 and 36 respectively; below trough 12 at inlet end 18, a transverse shaft 46 is rotatably journaled and has sprockets 48 and 50 keyed thereon for supporting one end of drive chains 34 and 36. Shaft 38 is rotatably driven in a counter-clockwise direction as viewed in FIGURE 1 by a motor 52 through a pulley-belt assembly 54, a counter shaft 55, a pulley-belt assembly 56, a conventional geared speed reducer 58, and a chain-sprocket assembly 60. Thus, dual circular members 30 are translationally moved through trough 12 from end 18 to end 24.

Rotary motion is imparted to circular member 30 through a sprocket 62 keyed to each shaft 32 which engages an endless chain 64. Chain 64 is supported generally parallel to chains 34 and 36 by an idler sprocket 66 adjacent trough outlet end 24 and a drive sprocket 68 adjacent the opposite end of the trough. A shaft 70 supports sprocket 68 and is journaled for rotation on frame 17. Shaft 70 is rotatably driven through a sprocket 72 keyed thereto, a sprocket 74 keyed to shaft 46, and drive chain 76 engaging sprockets 72 and 74. Such arrangement causes shafts 46 and 70 to be rotated in the same direction, as a consequence of which chains 36 and 64 move in the same direction. The relative sizes of sprockets 48, 74, 72 and 68, however, are so chosen that chain 64 moves at a lower speed than chain 34; this differential speed of travel results in clockwise rotation, as viewed in FIGURE 13, of shaft 32 and circular members 30. Therefore, the upper circular surface of circular member 30 moves in a direction opposite the translational movement of the circular member caused by chains 34 and 36.

In operation fruit is aligned in trough 12 as follows: as fruit is deposited into the trough at inlet end 18, it is engaged by the periperhal surface of dual circular member 30 and by the opposing faces of planar members 14 and 16. The translational movement of circular member 30 caused by drive chains 34 and 36 causes the fruit to be moved toward trough outlet end 24; rotational movement imparted to dual circular member 30 due to the speed differential between chain 64 and drive chains 34 and 36 causes the fruit to be rolled within trough 12 in a sense opposite that of the dual circular member. Because the fruit is symmetrical only about the suture line, it will engage the opposing surfaces of planar members 14 and 16 at the same level only if the suture line is aligned in a vertical plane. If the fruit is otherwise aligned it will engage planar members 14 and 16 at different levels with the results that the movement of one side of the fruit will be resisted by the planar member surfaces more than the movement of the other side of the fruit. The force of gravity acting on the fruit and the rotational and translational movement thereof conjoin to orient the fruit so that the suture line is vertical before the arrival of the fruit at outlet end 24. When the fruit is so aligned it is rolled along the trough, thus minimizing abrasive rubbing action between fruit and the trough. Should more than one piece of fruit be discharged between two adjacent circular members 30, all but one piece of fruit will be displaced rearwardly (rightwardly as viewed in FIGURE 1) so as to permit the above described aligning action to proceed. The rotational movement of circular member 30 imparts a rotary movement to the piece of fruit engaging the surface of the circular member. If a second piece of fruit is forward of the first piece, its contact with the first piece tends to brake the rotary movement of the first piece. The force of friction between the surface of circular member 30 and the braked piece of fruit causes the fruit to be carried up and over circular member 30 to the rear thereof. The second piece of fruit is now engaged by circular member 30 and will be properly aligned as described above. In the event that there is still more than one piece forward of circular member 30, all but one piece will be moved rearwardly in the foregoing manner.

Placement of rotary dual members 30 below trough 12 and clockwise rotation (as viewed in FIG. 1) of the rotary members serves to prevent the fruit pieces from wedging in the trough. Avoidance of such wedging minimizes or eliminates bruising of the fruit.

As a result of varying weather conditions the shape of individual fruit pieces varies from year to year, in some years the fruit being a generally oval shape, in other years more nearly round. We have found that oval shaped fruit pieces are more readily aligned than the more nearly round pieces and that a trough defining an acute angle suffices to align the oval shaped pieces. Fruit pieces that are more nearly round, however, require the portion of the trough to define an obtuse angle. Because the apparatus of our invention is so constructed that planar members 14 and 16 can be adjusted or replaced, troughs defining different angular relations can be provided depending on the particular shape of the fruit for a given year. Thus in a year when the fruit is substantially round, a longer trough portion defining an obtuse angle is necessary than in years in which the fruit is substantially oval shaped.

Referring to FIGURES 4–6, a fruit piece F is shown at various positions along trough 12. It will be noted that at the input end of trough (FIG. 6) the horizontal distance between a vertical plane through the center of gravity CG and the point of contact P between the fruit and planar members 14 and 16 is less than such distance when the fruit is adjacent output end 24 (FIG. 4). We believe that such fact, in part, explains the theory of operation of our invention. At the input end, the fruit is randomly oriented and the force exerted on the fruit is proportional to the horizontal distance between the center of gravity and the point of contact. Because this distance is short at the input end, the fruit is brought into alignment gradually and without undue oscillation. As the fruit approaches alignment and approaches output end 24, the horizontal distance between the center of gravity and the point of contact is longer so that lesser degrees of eccentricity or misalignment of the fruit in the trough will influence the fruit. Since the fruit is nearly aligned when it approaches the acute angle portion at output end 24 oscillation of the fruit at that portion is less likely, thereby permitting the distance between the center of gravity and the point of contact of the fruit on the planar members to be lengthened.

We have found that provision of score lines or depressions 78 on the external periphery of disks 30a and 30b of circular members 30 and that provision of a slight taper 80 of about 3–4° at the peripheral surfaces of the disks affords optimum frictional force between the surfaces of the circular member and the fruit.

Many ways of constructing circular member 30 will appear to those skilled in the art. We prefer to construct them from identical interlocking sections of molded plastic. Each section includes a circular disk 82 and a hub 84 integral therewith. Each section is centrally bored at 86 to receive shaft 32. The inner face of disk 82 is formed with a raised circular boss 88 having a semi-circular raised portion 90 extending therefrom. When two such sections are mounted on shaft 32 with their inner faces opposite one another, they are rotationally interlocked by displacing semi-circular portion 90 of one section 180° from the semi-circular portion of the other section. A centrally bored spacer collar 92 is provided for transversely positioning circular member 30 relative drive chain 34. A centrally bored torque collar 94 is provided on the opposite side of circular member 30 for communicating rotary motion from sprocket 62 to the circular member. Collar 94 has a square shoulder portion 96 at each end thereof. Each hub 84 is formed with a square excised portion 98 for receiving shoulder 96 of collar 94. Sprocket 62 has a flange 100 affixed concentrically thereto, which flange is formed with a square excised portion 102 for receiving the other shoulder 96 of collar 94. Collar 94 also serves to properly transversely space dual circular member 30 relative sprocket 62. Such embodiment of circular member 30 in addition to functioning properly affords rapid installation or repair of the circular members.

Movement of fruit pieces F in trough 12 can be expedited by providing endless belts whose surfaces define the surfaces of the trough. Suitable sheaves are installed on shafts on opposite ends of each planar member 14 for rotation about axes parallel with planar members at their respective ends. The planar members back up the moving belts to maintain them in the proper angular relation to define the trough's sides. Movement of the belts in a direction such that the fruit contacting surfaces of the belts move toward halving knife 26 permits faster movement of the fruit pieces toward the knife.

The space 31 between opposite faces of sections 30a and 30b of circular member 30 is sufficiently wide to permit free entry therein of halving knife 26. The knife (FIGURE 11) includes a generally circular blade 104 having a plurality of smoothly curved convexities 106 on its circumference, thus to define an undulated periphery. Each convexity 106 is so shaped that the leading edge portion 106a thereof slopes radially outwardly at a more gradual rate than the trailing edge portion 106b slopes inwardly. Thus, the flesh of fruit F is subjected to gradually increasing pressure during the passage therethrough of each convexity 106. The center of blade 104 is affixed to a shaft 107 that is journaled for rotation in one end 108 of an arm 110. The opposite end 112 of arm 110 is freely pivotally mounted on shaft 55. An upstanding stop member 114 is provided for limiting the downward movement of arm 110 to prevent contact between blade 104 and circular member 30. A pulley 116 is affixed to shaft 107 in alignment with a pulley 118 affixed to shaft 55; a belt 120 extends between the pulleys to provide rotary power to blade 104 in response to actuation of motor 52. The direction of rotation of blade 104 is indicated by the arrows of FIGURES 1 and 11. When the piece of fruit arrives at trough end 24 it is contacted by the periphery of blade 104 and the flesh of the fruit is severed by the knife along the suture line. Due to the convexities on the periphery of blade 104 the amount of force applied to the fruit by the blade continuously varies and is thus self-compensating for variations in hardness and size between individual pieces of fruit. When the blade reaches the pit of the fruit the presence of the undulations on the blade periphery causes a pounding action on the fruit pit thus expelling the pit downwardly.

Planar members 14 and 16 are terminated at trough outlet end 24 with rearwardly slanting edges 122 which perform two important functions. First the slanted portions enlarge the trough outlet end 24, thus avoiding interference with the expelled pit. Second, the slanting edges 122 serve to maintain large fruit pieces under blade 104 for a longer period of time than smaller pieces there maintained. Because arm 110 is pivotally mounted it yields upwardly upon first contacting of the fruit and thus cuts the fruit rather than bruising it; after the cutting has started the weight of blade 104 and arm 110 forces the blade downwardly into the flesh of the fruit.

The individual pieces of fruit F are serially introduced into trough 12 from receptacle 20 disposed adjacent trough inlet end 18. The receptacle is formed with two vertical parallel opposed side walls 130 and 132 and by a flexible sheet 134 spanning the space between the vertical walls. Opposite ends of sheet 134 are affixed to horizontally aligned rods 136 and 137 that extend between vertical side walls 130 and 132. Approximately midway between rods 136 and 137 a rod 138 is provided for affixing a central portion of sheet 134 between the vertical side walls. Sheet 134 is free on the side edges thereof to move relative the side walls and is of such length that between rod 138 and end rods 136 and 137 it sags or extends below the plane defined by the rods. Sheet 134 can be constructed of any suitable flexible material; we have found that woven wire belting serves admirably. Use of woven wire belting also permits water to be sprayed on the fruit for washing it.

Below sheet 134 are shafts 140 and 142 which are journaled for rotation between the vertical side walls 130 and 132. Shaft 140 is positioned midway between rods 136 and 138; shaft 142 is positioned midway between rods 137 and 138. Attached to shaft 140 for rotation therewith are two mutually parallel elongate arms 144 having on the ends thereof suitable bearings for supporting rollers 146 and 148 in parallel spaced relation to shaft 140 for intermittently elevating sheet 134. Shaft 142 is similarly equipped, having attached thereto elongate arms 150 which are provided on the ends thereof with suitable bearings for mounting rollers 152 and 154 in parallel spaced apart relation to shaft 142. Sprockets 156 and 158 are affixed to shafts 140 and 142 respectively and are operatively connected to one another by an endless chain 160. Sprockets 156 and 158 are so positioned on shafts 140 and 142 that elongate arms 144 are circularly spaced 90° from elongate arms 150 on shaft 142 so that only one-half of sheet 134 is elevated at a given time. Also secured to shaft 142 is a sprocket 162 which is driven from a sprocket 164 on shaft 46 by an endless drive chain 166.

Chute 22 extends downwardly from receptacle 20 to trough inlet end 18. The chute is formed with two inwardly sloping surfaces 168 that extend upwardly and diverge at 170 to interior surfaces of side walls 130 and 132. Thus, there are formed two upwardly inclined portions 172 defining sloping faces interior of receptacle 20 against which fruit pieces F impinge.

The members defining surfaces 168 are spaced apart at the lower end of discharge chute 22 to permit circular members 30 to pass therebetween. Adjacent the lower end of surfaces 168 are rounded protuberances 174 which are affixed to surfaces 168 and serve to impede the discharge of fruit from chute 22. Protuberances 174 function to retain the fruit in chute 22 until the fruit is raised thereover by the movement of a dual circular member 30.

In operation, the serial feeder operates as follows. An unorganized accumulation of fruit pieces is dumped or otherwise placed in receptacle 20 while motor 52 rotatably drives shafts 140 and 142 in a counterclockwise direction as viewed in FIGURE 8. When the shafts are positioned as shown in FIGURE 8, the portion of flexible sheet 134 between rod 137 and roller 152 slopes downwardly toward the rod, as a consequence of which individual fruit pieces are directed into chute 22 by upwardly inclined portions 172. Because surfaces 168 of chute 22 slope inwardly the fruit pieces are serially aligned and rest against rounded protuberances 174 until raised thereover by circular member 30. When shafts 140 and 142 have rotated 90° from the position shown in FIGURE 8 the portion of flexible sheet 134 between rods 136 and 138 will be displaced upwardly by roller 146 bearing on the bottom of the sheet. At the same time, elongate members 150 on shaft 142 have assumed a generally horizontal position, thus permitting the portion of sheet 134 between rods 137 and 138 to sag or extend downwardly. Therefore fruit pieces in the rear of receptacle 20 will be moved to the forward portion of the receptacle to be urged against upwardly inclined portions 172 when shafts 140 and 142 rotate an additional 90° (180° from the position shown in FIGURE 8) because roller 154 will then bear against the lower surface of sheet 134 between rollers 137 and 138.

Should discharge chute 22 become filled with fruit, entry of additional fruit into the chute will be prevented thereby and such fruit will move rearwardly in receptacle 20 each time elongate arm 150 lies in a horizontal position. The movement of the fruit upon flexible sheet 134 is a rolling movement and therefore brusing or abrading of the fruit is avoided.

Flexible sheet 134 can be installed in receptacle 20 by affixing the sheet to vertical walls 130 and 132 only at the forward and rear ends of the receptacle and by providing only one pair of rollers rotatably moved by the shaft between the receptacle ends. Such modification is completely operable but we prefer to fix the flexible sheet in the center as described above. Also the sheet can be affixed at more than one point intermediate the ends of the receptacle provided that there is a shaft-arm-roller assembly beneath the sheet between each line along which the sheet is affixed and that adjacent arms are displaced 90° from one another.

The rate at which the individual fruit pieces are conveyed through receptacle 20 is altered by adjusting the position of rollers 152 and 154 on shaft 142. Referring to FIGURE 8 a sleeve 180 that is adapted to carry sprocket 156 is provided with a set screw or the like 182 for securing the sleeve to shaft 140. Thus the phase relationship between shafts 140 and 142 can be altered to adjust the rate of flow of fruit pieces. When the phase relation is 90°, as depicted in FIGURE 8, the flow through the conveyor is maximum. However, when the position of arms 144 on shaft 140 are advanced or retarded relative to the position of arms 150 on shaft 142 the rate of flow is decreased.

A second way for altering the rate of flow of fruit pieces through the conveyor is depicted in FIGURE 8A and is accomplished by altering the vertical position of shaft 140 relative to shaft 142. One or more arms 184 are pivotally attached to shaft 142 and are provided at their unattached ends with bearings for supporting shaft 140 for rotation. The rearward end 186 of arm 184 is provided with an opening for receiving an adjusting shaft 188. Shaft 188 is formed with an enlarged shoulder portion 190 for supporting arm 184 and with a threaded portion 192 which is engaged in a threaded opening of an apertured member 194 secured to frame 17. A knurled knob 196 is provided on the lower end of adjusting rod 188 to facilitate rotation of the rod. Rotation of rod 188 moves shoulder portion 190 vertically against arm 184 as a consequence of which shaft 140 is selectively vertically positioned. As shaft 140 is lowered relative to shaft 142 the rate of flow of fruit pieces through the conveyor is decreased and as shaft 140 is raised, the rate of flow is increased.

The speed of rotation of shaft 140 relative to the speed of rotation of shaft 142 also affects the rate of movement of fruit pieces through the conveyor. Referring to FIGURE 8B, an enlarged sprocket 156' is mounted on a shaft 140. Such enlarged sprocket causes shaft 140 to be rotated at a slower rate than shaft 142 and in turn causes the rate of movement of the fruit pieces through the conveyor to be decreased. Many ways in addition to providing a larger sprocket 156' on shaft 140 for altering the speed of that shaft with respect to the speed of shaft 142 will appear to those skilled in the art.

Trough 12 can be modified as shown in FIGURE 16 so that only pieces of fruit larger than a preselected size are transported to knife 26. Lower edges 14b and 16b of planar members 14 and 16 respectively are formed with cut out portions 198 and 200 respectively. The space between the inner edges of cut out portions 198 and 200 is equal to the smallest diameter of the largest size unacceptable fruit. Therefore when the fruit enters that portion of trough 12 defined by cut out portions 198 and 200, unacceptably small fruit pieces will fall through the trough and will not be transported to knife 26. The cut out portions are formed sufficiently remote from trough inlet end 18 that the fruit will be substantially aligned when it arrives at the cut out portions; thus the smallest diameter of the fruit is presented to the space between cut out portions 198 and 200.

The foregoing description concerns one fruit halving and pitting apparatus. It will be obvious that a plurality of such apparatus can be positioned side by side, thus multiplying the total fruit processing capacity. In this connection we have shown in FIGURE 2 in phantom form a second apparatus 202 powered from motor 52 by connection at 204 to shaft 55. The apparatus designated schematically at 202 contains all of the elements of that described above and can be multiplied as many times as is necessary to secure the desired fruit processing capacity.

In order to conserve space we prefer to closely space individual troughs in a multi-trough machine. Toward this end we provide a drive mechanism for blade 104 which is particularly useful when plural troughs and knives are used, but also useful when only one trough is used, and which is shown in FIGURES 17 and 18. A fixed horizontal shaft 206 is suitably secured to frame 17 and pivotally supports a plurality of arms 110, 110', the unsupported ends of which journal knife blades 104 and 104' for rotation. Each of the knife blades has a driving pulley 116, 116' associated therewith to which motive power is imparted from a roller 208 driven by belt 54. Roller 208 is supported for rotation at each end thereof by a bearing member 210 which is affixed to the end of an adjusting rod 212. Adjusting rod 212 has a threaded portion 214 engaged in a threaded apertured member 216 suitably supported on frame 17. Rod 212 is provided on the lower end with a knurled knob 218 for affecting vertical adjustment of bearing members 210. Roller 208 is peripherially grooved at 220 at each point opposite pulleys 116, 116' to permit installation of a resilient drive belt such as a neoprene O-ring 222 which is associated in driving relation with pulleys 116, 116'. Upward movement of bearing members 210 by rotation of rod 212 increases the tension in resilient belts 222 and therefore decreases the downward force exerted by knife blade 104 on the fruit pieces moving upwardly through troughs 12 and 12'. Such adjustment is important for the reason that fruit is processed at different stages of ripeness; as the fruit ripens, the flesh softens and less downward force of knife blade 104 is required. Because bearing members 210 in opposite ends of roller 208 are adapted to be moved simultaneously, the pressure on each individual resilient belt 222 is simultaneously and uniformly adjusted.

While one embodiment of this invention has been shown and described, it will be apparent that other adaptations and modifications may be made without departing from the true spirit and scope of the invention.

We claim:

1. Apparatus for halving and pitting apricots, peaches, and like fruit comprising means forming two opposed flat elongate surfaces, said surfaces slanting downwardly and inwardly to form a trough for conveying the fruit, said trough having an inlet end and an outlet end and being sloped with said outlet end at a level higher than said inlet end, said surfaces defining an obtuse angle at said inlet end and converging continuously to define an acute angle at said outlet end so that fruit traversing the trough will be aligned with the suture line thereof in a vertical plane, means for serially feeding fruit to said inlet end, means for rolling fruit in said trough from said inlet end to said outlet end, and a vertical knife depending into said trough at said outlet end for cutting the fruit.

2. Apparatus for orienting apricots, peaches and the like fruit having a suture line so that the suture line lies in a vertical plane comprising means forming two opposed flat elongate surfaces, said surfaces slanting downwardly and inwardly to form a trough, said trough having an inlet end and an outlet end and being sloped with said outlet end at a level higher than said inlet end, said surfaces defining an obtuse angle at said inlet end and converging continuously to define an acute angle at said outlet end, and means for rolling fruit in said trough from said inlet end to said outlet end.

3. Apparatus for aligning apricots, peaches and like fruit comprising means forming two opposed flat elongate surfaces, said surfaces slanting downwardly and inwardly toward one another to form a trough, said trough having an inlet end and an outlet end and being sloped with said outlet end at a level higher than said inlet end, said surfaces defining an obtuse angle at said inlet end and converging continuously to define an acute angle at said outlet end, means for serially feeding fruit to said inlet end, and means for rolling fruit in said trough from said inlet end to said outlet end so that at said outlet end the fruit is aligned with the suture line in a substantially vertical plane.

4. Apparatus according to claim 3 wherein said fruit feeding means includes means forming a downwardly sloping chute for discharging fruit into the inlet end of said trough and means for retaining fruit in said chute proximate said trough, said fruit rolling means being adapted to raise fruit over said retaining means into said trough.

5. Apparatus for halving and pitting fruit comprising a pair of opposed members defining a generally V-shaped elongate trough, said trough having an inlet end and an outlet end, said outlet end being at a level higher than said inlet end, said members being spaced apart at the base of the V, means extending upwardly through said space to roll the fruit along the trough from the inlet end to the outlet end, said outlet end being formed with edges slanting from the upper extremity of the V downwardly and rearwardly toward said inlet end so that fruit pieces reside at said outlet end for a duration proportional to the diameter thereof, and a vertical cutting blade depending into said trough at said output end for cutting fruit residing thereon.

6. Apparatus for halving and pitting apricots, peaches and like fruit comprising a pair of generally parallel elongate surface forming members symmetrically disposed relative a vertical plane, said members having lower edges spaced from one another and upper edges extending upwardly and outwardly from said lower edges to define a generally V-shaped fruit conveying trough, said trough having an inlet end and an outlet end disposed at a level higher than said inlet end, the surfaces formed by said members defining an obtuse angle at said inlet end and converging continuously to form an actue angle at said outlet end, means for rolling fruit in said trough from said inlet end to said outlet end, and a cutting knife disposed in said plane, said cutting knife depending into said trough at said outlet end.

7. The invention of claim 6 wherein said surface forming members define an angle of approximately 115° at said inlet end and approximately 50° at said outlet end.

8. Apparatus according to claim 6 wherein said fruit rolling means comprises a substantially circular member extending upwardly into said trough between the spaced lower edges of said surface forming members, said circular member being formed with a central vertically disposed slot for receiving said cutting knife therein, means for longitudinally moving said circular member from said inlet end to said outlet end, and means for rotatably driving said circular member in such direction that the upper circular surface thereof moves in a direction opposite the direction of longitudinal movement.

9. Apparatus for halving and pitting apricots, peaches and like fruit comprising a pair of elongate planar members, said members being disposed generally parallel along their axes of elongation and slanting downwardly and inwardly transverse the axis of elongation, said members being disposed with their upper extremities spaced apart by a distance greater than the maximum diameter of fruit to be halved and seeded and at their lower extremity being spaced apart less than the minimum diameter of the fruit to be halved and seeded, said planar members being mounted with one longitudinal end thereof at a level higher than the opposite longitudinal end thereof and being angularly oriented relative one another to define an acute angle at said higher end, an obtuse angle at the opposite end and converging continuously from last said end to said higher end, means for rolling fruit in said trough toward said higher end, each said member at said higher end being terminated with an edge sloping from the upper extremity of the member downwardly toward the lower extremity of the member toward said opposite longitudinal end so that fruit pieces reside at said higher end for a duration proportional to the diameter thereof, and a vertical cutting blade depending into said trough at said higher end.

10. Apparatus for halving and pitting apricots, peaches and like fruit comprising means forming a trough for said fruit, said trough having opposing slanting fruit supporting walls arranged in a generally V-shaped configuration, said walls defining an acute angle at one end of said trough and diverging to an obtuse angle remote from said one end, means for rolling said fruit in said trough toward said one end, a generally circular knife blade having an undulate periphery thereon, means for supporting said knife proximate said one end of said trough, said supporting means including an arm mounted for pivotal movement about an axis above and transverse said trough, means spaced from said axis for rotatably journaling said knife on said arm, and means for rotatably driving said knife, said supporting means being adapted to yield upwardly in response to contact by said knife with a fruit pit in said trough.

11. The invention of claim 10 wherein the undulate periphery of said blade is formed with a plurality of curved convexities, each convexity having a leading edge portion and a trailing edge portion, said leading edge portion being so disposed that it contacts the fruit before the trailing edge portion in response to rotation of said blade, said leading edge portion sloping outwardly at a more gradual rate than said trailing edge portion.

12. Apparatus for grading, halving and pitting apricots, peaches and like fruit comprising a pair of elongate planar members, said members being disposed generally parallel along their axes of elongation and slanting downwardly and inwardly transverse the axis of elongation, said members being disposed with their upper extremities spaced apart by a distance greater than the maximum diameter of fruit to be halved and seeded and at their lower extremity being spaced apart by an amount substantially equal to the smallest sized acceptable fruit to be halved and pitted, thereby permitting undersized fruit to drop said lower extremities, said planar members being mounted with one longitudinal end thereof at a level higher than the opposite longitudinal end thereof and being angularly oriented relative one another to define an acute angle at said higher end, an obtuse angle at the opposite end and converging continuously from last said end to said higher end, and means including a vertical blade for cutting said fruit at said higher end, said blade depending into said trough.

13. Apparatus for halving and pitting apricots, peaches and like fruit comprising means forming a plurality of troughs for said fruit, each said trough having opposite slanting fruit supporting walls arranged in a generally V-shaped configuration, said walls defining an acute angle at one end of said trough and diverging to an obtuse angle remote from said one end, means for rolling said fruit in said trough toward said one end, and a rotatably driven circular knife mounted above each said trough at said one end depending into said trough.

14. Apparatus according to claim 13 in combination with means for mounting said knives, said mounting means comprising an arm associated with each said knife blade having a first end and a second end, means for rotatably journaling each said knife in the first end of the arm associated therewith, means for pivotally mounting the second end of each said arm along an axis above said troughs, a driven roller journaled above said axis and parallel thereto, each said knife blade having a driving pulley mounted concentrically therewith, a resilient belt in driving relation between each said pulley and said roller for rotatively driving said knife.

15. The invention according to claim 14 in combination with means for adjusting the vertical position of said roller thereby to adjust uniformly the tension on said resilient belts.

References Cited by the Examiner
UNITED STATES PATENTS

| | | | |
|---|---|---|---|
| 2,293,133 | 8/1942 | Halferty | 146—73 X |
| 2,417,174 | 3/1947 | Prenveille | 146—28 |
| 2,644,568 | 6/1953 | Wells | 198—30 |
| 2,667,961 | 2/1954 | Reese et al. | 198—56 |
| 2,735,465 | 2/1956 | Kellogg | 146—72 |
| 2,823,717 | 2/1958 | Amori | 146—73 |
| 2,827,089 | 3/1958 | Amori | 146—73 |
| 3,087,522 | 4/1963 | Ciraolo | 146—73 |

LESTER M. SWINGLE, *Primary Examiner.*

ROBERT C. RIORDON, J. SPENCER OVERHOLSER,
*Examiners.*

WILLIE G. ABERCROMBIE, *Assistant Examiner.*